(12) United States Patent
Kazuno et al.

(10) Patent No.: US 6,620,517 B2
(45) Date of Patent: Sep. 16, 2003

(54) METHOD FOR PRODUCING RUBBER-RESIN COMPOSITE

(75) Inventors: Atsushi Kazuno, Osaka (JP); Masashi Moriyama, Osaka (JP); Toshiya Tsujimoto, Osaka (JP); Hirokazu Masui, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 0 days.

(21) Appl. No.: 09/980,812

(22) PCT Filed: Feb. 5, 2001

(86) PCT No.: PCT/JP01/00810

§ 371 (c)(1),
(2), (4) Date: Dec. 7, 2001

(87) PCT Pub. No.: WO01/66332

PCT Pub. Date: Sep. 13, 2001

(65) Prior Publication Data

US 2003/0035974 A1 Feb. 20, 2003

(30) Foreign Application Priority Data

Mar. 9, 2000 (JP) .......................................... 2000-64642

(51) Int. Cl.⁷ .............................................. B32B 25/08
(52) U.S. Cl. ...................... 428/448; 428/447; 428/451; 156/333; 156/242; 264/134; 264/135; 264/240; 264/250

(58) Field of Search ................................. 428/447, 448, 428/451; 156/333, 242; 264/135, 134, 250, 240

(56) References Cited

U.S. PATENT DOCUMENTS 3,988,188 A * 10/1976 Johansen et al. ........... 156/143
4,994,222 A 2/1991 Iizumi et al.

FOREIGN PATENT DOCUMENTS

| JP | 62-104717 | 5/1987 |
| JP | 6-198688 | 7/1994 |
| JP | 11-10673 | 1/1999 |
| JP | 11-348067 | 12/2000 |

* cited by examiner

*Primary Examiner*—Robert Dawson
*Assistant Examiner*—Christopher M. Keehan
(74) *Attorney, Agent, or Firm*—Knobbe Martens Olson & Bear, LLP

(57) ABSTRACT

A method of producing a rubber-resin composite whose vulcanized rubber and thermoplastic resin moldings are bonded together by high adhesive strength at low cost, satisfying both moldability and mechanical strength. It comprises: (1) making the vulcanized rubber molding by vulcanization molding, (2) forming an adhesive layer, whose principal ingredient is chlorosulfonated polyethylene, on a surface of the rubber molding to be bonded to the resin, and (3) while arranging the rubber molding in a mold, pouring the thermoplastic resin containing 30~60 wt. % of glass fiber in a molten state into the mold to form the resin molding.

11 Claims, 3 Drawing Sheets

METHOD FOR PRODUCING RUBBER-RESIN COMPOSITE

This application is the U.S. National Phase under 35 U.S.C. §371 of International Application PCT/JP01/00810, filed Feb. 5, 2001, which claims priority to Japanese Patent Application No. 2000-64642, filed Mar. 9, 2000, the disclosure of which is herein incorporated by reference in its entirety. The International Application was not published under PCT Article 21(2) in English.

BACKGROUND OF THE INVENTION

1. Field of the Invention

This invention relates to a method of producing a rubber-resin composite structure, wherein a vulcanized rubber molding and a resin molding formed from a thermoplastic resin are adhesive bonded together at a high strength.

2. Description of the Related Art

Recently thermoplastic resins superior in mechanical strength, heat resistance, etc. such as engineering plastics or the like have been widely used as a metal substitute material, taking advantage of their characteristics and workability, and application fields of rubber-resin composites superseding rubber-metal composites are enlarging. For instance, with a rubber bushing used for an automobile suspension, etc. its outer cylinder surrounding a rubber elastomer is being changed from metal-made to a thermoplastic resin-made. Also in the fields of suspensions of machinery, vibration insulation or vibration damping components for architectures, a composite is used such that vulcanized rubber molding and resin molding of a high-rigidity resin material are united together.

These rubber-resin composites are generally produced by coating a chlorine-containing vulcanization adhesive agent to a surface of a thermoplastic resin molding and subsequently applying an unvulcanized rubber thereto, thus bonding by vulcanization. Accordingly, this process has various problems in that it necessitates a number of facilities at the vulcanization step, the heat of vulcanization affects the resin molding, and so on.

As a method applicable to the production of a rubber bushing fitted with an outer cylinder made of resin mentioned above, JP Patent Publication 1990-84310 A1 proposes such a process that comprises subjecting a surface of the vulcanized rubber molding to chlorination treatment, forming a vulcanization adhesive layer containing, as primary ingredients, resorcinol type phenol resin and aldehyde-modified polyvinyl alcohol on the chlorination-treated surface, arranging it in a mold cavity followed by injection molding of a thermoplastic resin under heating and melting condition. There, additional process is also proposed, which comprises forming a vulcanization adhesive layer containing chlorosulfonated polyethylene as a principal ingredient and injection molding a thermoplastic resin under heated and melted condition while heating the vulcanized rubber.

According to the method thus disclosed, a rubber-resin composite can be produced at a low cost without entailing deterioration in physical properties or deformation of thermoplastic resin due to heat history. Nevertheless this method runs into the difficulty that in producing a vibration-proof member for supporting a heavy-weight member such as automobile engine mount in a vibration-proof manner, sufficient mechanical strength cannot always be obtained. That is, for a vibration-proof rubber member exerted by high load, a thermoplastic resin is required to have a high mechanical strength to the extent that is not ruptured by the high load.

SUMMARY OF THE INVENTION

In view of the aforementioned problems, a principal object of this invention is to provide a method of producing a rubber-resin composite, wherein a vulcanized rubber molding and a thermoplastic resin molding are adhesive bonded together with a high adhesive strength, without causing deformation of the resin due to thermal history, while satisfying both moldability and mechanical strength.

This invention consists in a method of producing a rubber-resin composite composed of a vulcanized rubber molding and a thermoplastic resin molding adhesively bonded to it, which method comprises the sequential steps of (1) to (3):

(1) fashioning the vulcanized rubber molding by vulcanization molding;
(2) forming an adhesive layer containing as a primary component chlorosulfonated polyethylene on a surface of the vulcanized rubber molding to be bonded to the thermoplastic resin; and
(3), while arranging the vulcanized rubber molding in a mold, pouring a thermoplastic resin containing 30 to 60% by weight of inorganic short fiber under molten state into the mold thereby forming the thermoplastic molding and simultaneously adhesive-bonding the resin molding to the vulcanized rubber molding through the adhesive layer.

According to this invention, after the vulcanization adhesive layer containing primarily chlorosulfonated polyethylene is formed on the surface of the vulcanized rubber molding to which the resin is to be bonded, the thermoplastic resin is thus molded. Hence it is possible to produce the rubber-resin composite, whose vulcanized rubber and thermoplastic resin are bonded together at a high adhesive strength, without entailing deterioration in physical properties and deformation of the resin, at a low cost. Furthermore the thermoplastic resin contains 30 to 60% by weight of inorganic short fiber and consequently, it is possible to improve the mechanical strength of the resin molding without impairing the moldability.

In case where the inorganic short fiber is thus added to the thermoplastic resin to the extent that a sufficient reinforcement to the thermoplastic resin is exhibited, only by the adhesive layer containing as a principal ingredient chlorosulfonated polyethylene, there is a possibility that a sufficient adhesive strength between the rubber molding and the resin molding cannot be achieved. In that case, it is preferred to use the following procedures, either (a) or (b) below:

(a) a procedure of forming the adhesive agent layer by a composition obtained by adding a coupling agent to the adhesive agent containing as a primary ingredient chlorosulfonated polyethylene;
(b) a procedure of applying a coating solution containing a coupling agent to the surface of the adhesive layer after it is formed.

By adopting either of these procedures it is possible to enhance the adhesive strength to the vulcanized rubber molding to a sufficient degree from the practical viewpoint albeit the resin molding containing sufficient amount of inorganic short fiber for reinforcement purposes and to accomplish a stabilized adhesive strength.

DESCRIPTION OF PREFERRED EMBODIMENTS

Figure 1:
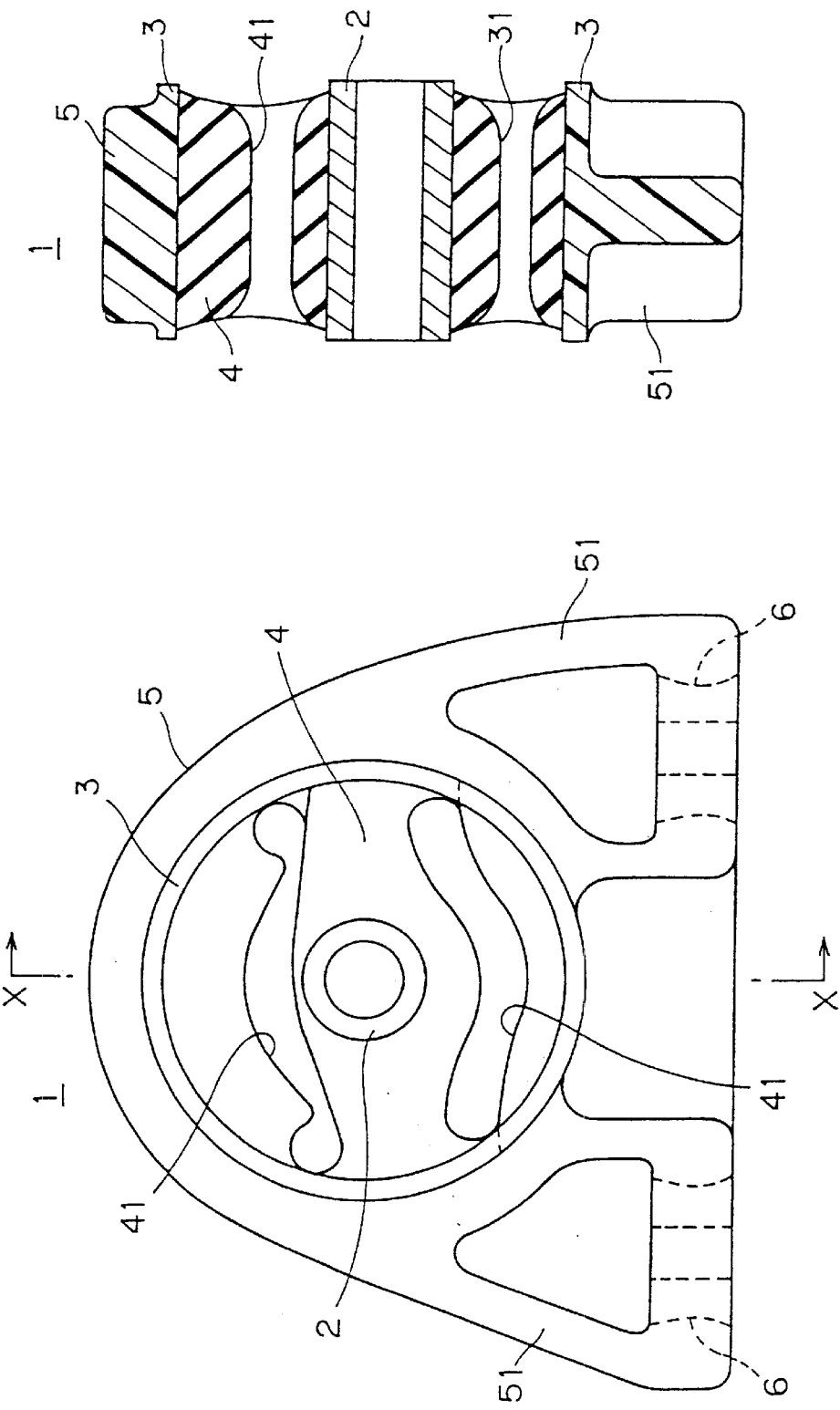
FIG. 1A and FIG. 1B are a front elevational view of one example of a cylindrical engine mount and a sectional view of FIG. 1A taken along X—X line, respectively.
Figure 2:
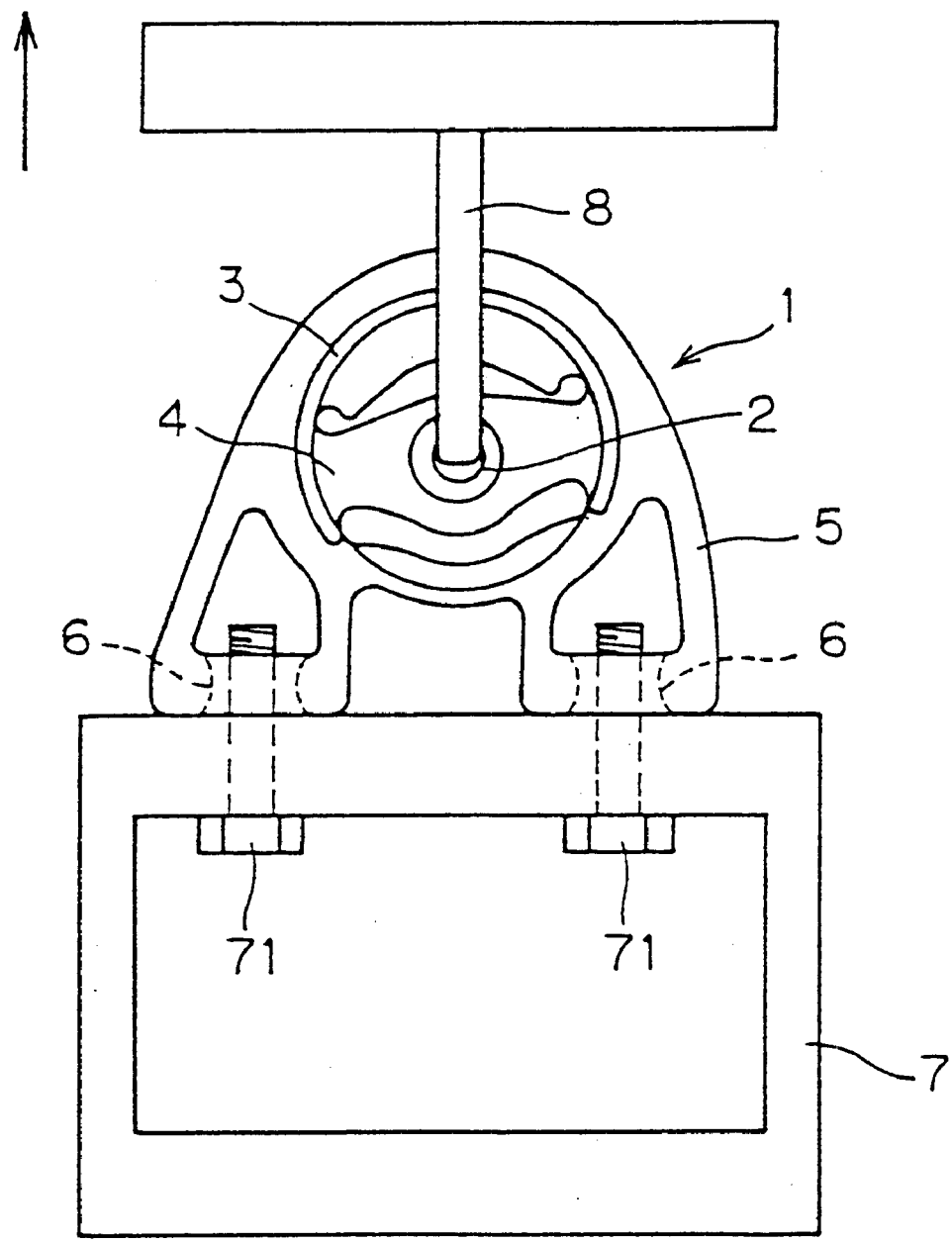
FIG. 2 is a front elevational view of the engine mount in FIG. 1 illustrating a static rupture test thereof.

The invention will be hereinafter described in more detail with reference to the drawings regarding the practice of the invention.

In this invention, the vulcanized rubber molding is made by vulcanization molding a rubber composition containing a rubber material. As a rubber material any one customarily employed for rubber moldings such as vibration-proof rubber, etc. can be employed without limitation. More specifically, the rubber material includes, for example, diene series rubber, e.g., nitrile rubber (NBR), styrene-butadiene rubber (SBR), butadiene rubber (BR), isoprene rubber (IR), chloroprene rubber (CR), etc., olefinic rubber, e.g., ethylene-propylene rubber (EPR, EPDM), butyl rubber (IIR), halogenated butyl rubber, e.g., brominated butyl rubber (Br-IIR), polyurethane rubber, acryl rubber, fluorine rubber, silicone rubber, chlorosufonated polyethylene, or other synthetic rubber, natural rubber, etc. singly or in combination of two or more kinds.

For the rubber composition, antioxidant, wax, coloring agent, carbon black or silica, filler such as calcium carbonate, mica, etc., plasticizer, softener such as process oil, tackifier, antioxidant, vulcanization accelerator, or other additives known per se can be incorporated whenever necessary. To cross-link the rubber composition conventional method such as sulfur cross-linking, peroxide cross-linking, or other conventional cross-linking can be applied without limitation. Conventional vulcanization molding method such as mold vulcanization, press vulcanization, etc. can be adopted.

Exemplary thermoplastic resin for forming the resin molding in this invention includes general-purpose thermoplastic resins, such as polyolefine, e.g. polyethylene, polypropylene, etc., polyvinyl chloride, polyvinylidene chloride, acrylonitrile-styrene resin (AS resin), ABS, or other acrylic resins, etc.; so-called engineering plastics, such as polyamide, polycarbonate, poyester, e.g. polyethylene terephthalate (PET), polybutylene terephthalate (PBT), polyacetal, modified polyphenylene ether, etc.; so-called super engineering plastics, such as polyphenylene sulfide, polyetheretherketone (PEEK), polyarylate, polysulfone, polyethersulfone, polyketone sulfide, polyether imide, aromatic polyester, polyaminobismaleimide, triazine resin, etc. Among them, it is preferred to employ a high-strength, high-rigidity one, taking into account the resin molding constituting a structural member.

As an inorganic short fiber to be added to the thermoplastic resin, any conventional reinforcing material for thermoplastic resin can be used without limitation. More specifically exemplified are glass fiber, whisker such as potassium titanate whisker, zinc oxide whisker, calcium sulfate whisker, etc. The inorganic short fiber is, if need be, treated with a coupling agent and then kneaded and dispersed with the thermoplastic resin. Particularly preferable inorganic short fiber is chopped glass fiber because its price is cheap and a high-strength resin molding can be formed.

According to the production method of this invention, the surface of the vulcanized rubber molding beforehand fabricated, to which the thermoplastic resin will be bonded, is coated with an adhesive containing as a primary ingredient chlorosulfonated polyethylene thereby to form adhesive layer thereon. Here, in order to improve the adhesive strength of the rubber molding and resin molding, it is preferred to add a coupling agent to the aforementioned adhesive. Alternatively, after the adhesive layer composed primarily of chlorosulfonated polyethylene is formed, a coating solution containing the coupling agent may be applied onto the surface of the adhesive layer whereby it is also possible to improve the adhesive strength.

As such a coupling agent there may be mentioned silane coupling agent, titan coupling agent, zirconium coupling agent, aluminum coupling agent or the like, but it is more preferred to use silane coupling agent, titan coupling agent and zirconium coupling agent, and the use of silane coupling agent and titan coupling agent is most preferred in the respect of an excellent improvement effect in adhesive strength.

As the silane coupling agent, a compound having at least one alkoxysilyl group and another substituent can be used alone or in combination of two or more kinds. More specifically, such compound includes β-(3,4-epoxycyclohexyl)ethyltrimethoxysilane, γ-glycydoxypropylmethyldiethoxysilane, γ-glycydoxypropyltriethoxysilane, γ-glycydoxypropyltrimethoxysilane, N-(β-aminoethyl)-γ-amino propylmethyldimethoxysilene, N-(γ-aminoethyl)-γ-aminopropyltrimethoxysilane, γ-aminopropyltrimethoxysilane, γ-aminopropyltriethoxysilane, γ-isocyanatopropyltrimethoxysilane, γ-isocyanatopropyltriethoxysilene, or other silane having isocyanate functionality, thiocyanatopropyltriethoxysilane, γ-methacryloxypropyltrimethoxysilane, γ-methacryloxypropylmethyldiethoxysilane, γ-methacryloxypropyltriethoxysilane, vinyltriethoxysilane, vinyltrimethoxysilane, vinyltri(γ-oxymethylethoxy)silane, γ-mercaptopropyltrimethoxysilane, γ-mercaptopropyltriethoxysilane, bis-3-triethoxysilylpropyltetrasulfide, bis-3-triethoxysilylpropyldisulfide, etc.

Of the preceding compounds, particularly preferred silane coupling agents are bis-(3-triethoxysilylpropyl)tetrasulfide as represented by the formula (1) below, bis-(3-triethoxysilylpropyl)disulfide represented by the formula (2) below, thiocyanatopropyltriethoxysilane represented by the formula (3) below, vinyltrimethoxysilane represented by the formula (4) below, γ-methacryloxypropyltrimethoxysilane represented by the formula (5) below, β-(3,4-epoxyhexyl) ethyltrimethoxysilane represented by the formula (6) below, γ-glycydoxypropyltrimethoxysilane represented by the general formula (7) below and γ-mercaptopropyltrimethoxysilane represented by the general formula (8) below.

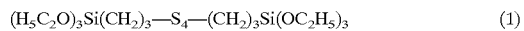

$$(H_5C_2O)_3Si(CH_2)_3-S_4-(CH_2)_3Si(OC_2H_5)_3 \quad (1)$$

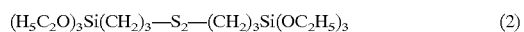

$$(H_5C_2O)_3Si(CH_2)_3-S_2-(CH_2)_3Si(OC_2H_5)_3 \quad (2)$$

$$(C_2H_5O)_3Si(CH_2)_3SCN \quad (3)$$

$$CH_2=CHSi(OCH_3)_3 \quad (4)$$

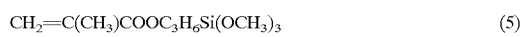

$$CH_2=C(CH_3)COOC_3H_6Si(OCH_3)_3 \quad (5)$$

(6)

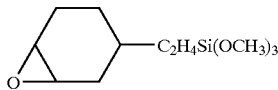

-continued

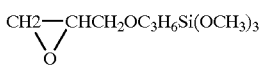  (7)

  (8)

As the titan coupling agent, organic titanate esters can be used, and exemplified by tetramethyl orthotitanate, tetraethyl orthotitanate, tetrapropyl orthotitanate, tetraisopropyl orthotitanate, tetrabutyl orthotitanate, butyl polytitanate, cresyl titanate polymer, stearyl titanate, tetraisobutyl orthotitanate, 2-ethylhexyl titanate, di-isopropoxy-bis(2,4-pentadithionate)titan, di-isopropyl ditriethanol aminotitanate, isopropylhexylene glycol titanate, etc.

Another coupling agent such as N,N'-bis(2-methyl-2-nitropropyl)-1,6-diaminohexane represented by the formula (9) below can also be used.

  (9)

The aforementioned coupling agent may be used as it is or otherwise may be used in the form of a solution dissolved in a suitable solvent whenever necessary. Such a solvent includes, for example, water, alcohol, e.g., ethanol, isopropanol, etc. ketone, e.g., methyl ethyl ketone, etc., ester, e.g., ethyl acetate, etc., cellosolve, hydrocarbon, e.g., n-hexane, cyclohexane, etc.

For the adhesive agent, either one prepared by dissolving chlorosulfonated polyethylene in a suitable solvent and adding necessary additive or commercially available one may be used. The thickness of the adhesive agent layer to be applied is not limited if only a necessary adhesive strength is exhibited, but generally is on the order of 5 to 50 $\mu$m. Customary means may be used for the coating of adhesive agent, for example, brush coating, dipping, spray coating, or the like.

Where the adhesive agent does not contain the coupling agent, the proportion of chlorosulfonated polyethylene in the adhesive layer is preferably 80 weight % or upward. On the other hand, where the adhesive agent further contains the coupling agent, the proportion of chlorosulfonated polyethylene plus coupling agent in the adhesive is preferred to be 90 weight % or upward. The mixing ratio of the two ingredients is preferably 10 to 25 parts by weight of coupling agent per 100 parts by weight of chlorosulfonated polyethylene.

In a preferred embodiment, before coating the adhesive agent, the surface of the vulcanized rubber molding is subjected to pretreatment such as plasma treatment, corona discharge treatment, or the like.

After the adhesive layer is formed in this manner, the vulcanized rubber molding is arranged within a mold assembly. The mold assembly is provided with a rubber-receiving mold cavity for housing the rubber molding and a resin-forming mold cavity for forming a thermoplastic resin molding therein. The rubber molding thus surface treated is arranged within the rubber-receiving mold cavity. The vulcanized rubber molding may be preheated, before setting in the mold cavity, at ca. 100 to 150° C. for about 10 to 300 minutes or may be set without preheating, but the setting without preheating is better, affording a higher adhesive strength.

Subsequently to setting, thermoplastic resin containing 30 to 60 weight % of inorganic short fiber under molten state is poured into the resin-forming mold cavity, and a resin molding is formed and concurrently is adhesive bonded and united to the vulcanized rubber molding through the adhesive layer.

Here, as is apparent from examples described below, if the amount of the inorganic short fiber contained is less than 30% by weight, a sufficient mechanical strength cannot be ensured whilst if it is in excess over 60% by weight, the viscosity of thermoplastic resin upon molding becomes too high to impair the moldability. From the viewpoint of ensuring a sufficient mechanical strength also in the case of a vibration-proof member undergoing a high load, such as engine mount, the amount of inorganic short fiber is more preferred to be 45 to 60% by weight.

The pouring in the resin-forming cavity can be conducted in a customary procedure, for example, by transfer molding, flow molding, injection molding or the like. However injection molding is most preferred from the aspect of moldability, After the resin molding is formed, a rubber-resin composite is thus obtained by removal from the mold assembly. After the completion of molding and before mold release, the resulting product may be subjected to post-curing step where it is heated and maintained at 100° C. This is more preferred, yielding a stronger adhesiveness.

According to the production method of this invention, a vibration-insulating or vibration-damping member can be produced. Such vibration-proof member is usually mounted between high-rigidity structural members and serves to prevent the vibration of the one structural member from transmitting to the other structural member. It is provided with rigid materials respectively to be fitted to the structural members. At least one of the rigid materials is of the thermoplastic resin molding described above while the other rigid material may be made of metal or ceramic material or the same thermoplastic resin molding. Both rigid materials are preferably made of the thermoplastic resin moldings, because more weight reduction of the vibration-proof member, etc. is realized.

The method of this invention is suitable for the production of a cylinder type engine mount, which is provided with an inner cylinder, an outer cylinder made of a thermoplastic resin molding and surrounding the inner cylinder in axially parallel with it, and a vulcanized rubber molding interconnecting the inner and outer cylinders.

FIG. 1 shows one example of such a cylindrical engine mount. This engine mount 1 comprises an inner cylinder 2 of metal horizontally provided, an outer cylinder 3 surrounding the inner cylinder 2 in axially parallel to and concentrically with it, and a vulcanized rubber 4 interposed between and elastically interconnecting the inner cylinder 2 and the outer cylinder 3, the inner cylinder 2 being connected to a bracket not shown on the engine side, the outer cylinder 3 being fixed to the vehicle body side.

The outer cylinder 3 is provided to be made integral with a bracket 5 fastened to the vehicle body side, and the integral body of the outer cylinder 3 and the bracket 5 is made of the thermoplastic resin molding as described above. The bracket 5 is provided with right-hand and left-hand leg portions 51 for fixing to the vehicle body, in each of which a nut 6 made of metal is embedded. The vulcanized rubber 4 has at its partial peripheral portion a hollow space 41 axially piercing through.

In fabricating the engine mount 1, first, an unvulcanized rubber is fitted around the inner cylinder 2 to form a composite piece of the inner cylinder 2 and the vulcanized rubber 4 integrally united together. Next, on the outer circumference of the vulcanized rubber 4 of the composite piece is coated an adhesive agent containing as a primary ingredient chlorosulfonated polyethylene, thereby to form the adhesive layer. At that time, a coupling agent may be used together with the adhesive. Then, the composite piece having the adhesive layer formed thereon is arranged within a mold assembly. By injecting the thermoplastic resin, the outer cylinder 3 and the bracket 5 are united integrally around the outer circumference of the vulcanized rubber 4. After removal from the mold, the engine mount 1 is thus obtained.

This invention is not limited to this example of engine mount, but is applicable to versatile fields of rubber-resin composites, such as various vibration-proof members for vehicles, e.g., automobile suspension systems, machinery suspensions, vibration-insulating or vibration-damping members for architectural materials.

The invention will be hereinafter described in more detail by way of non-limitative examples.

EXAMPLE 1

The engine mount 1 as shown in FIG. 1 was fabricated in the following procedure: First, the rubber composition indicated in Table 1 given below was vulcanization molded into a composite piece of the inner cylinder 2 and the vulcanized rubber 4. Onto the outer circumferential surface of the vulcanized rubber 4, an adhesive was coated so that a film thickness after drying was ca. 15 μm and dried. As the adhesive, an adhesive composition prepared by adding bis-3-triethoxysilylpropyltetrasulfide (trade name: Si-69 manufactured by Degussa Co.) as a coupling agent to an adhesive containing as a principal ingredient chlorosulfonated polyethylene trade name: Chemlok 25 2X manufactured by Lord Co.) were used. The amount of the coupling agent added was 25% by weight based on the solid content of the adhesive. The composite piece was arranged into the mold, and polyamide 66 compounded with glass fiber chopped strand was injection molded, thus forming integrally the outer cylinder 3 and the bracket 5 around the vulcanized rubber 4. Heating on a dryer at 100° C. for 20 minutes, immediately after removal from the mold, the engine mount 1 was obtained. Five kinds of the engine mounts were fabricated in this manner by varying the content of the glass fiber in the thermoplastic resin in a range of from 20 to 70% by weight as given in Table 2 below. The glass fiber was in the form of pellets mingled in the resin and of chopped strand of a diameter of 10 to 13 μm and a length of 700 to 800 μm. Moldability was evaluated and static rupture strength of the resulting engine mounts was measured, and results obtained are also shown in Table 2.

As for the moldabillity, injection molding was conducted 1000 times and products obtained were judged in terms of acceptance and rejection, as a result of which the moldability was evaluated from the percentage of accepted products. The judgment of acceptance and rejection resorted to the observation of whether the occurrence of sink marks or voids is seen in the resin part of the outer cylinder 3 and the bracket 5, which occurrence is ascribable to the fact that the nozzle part of the molding machine cannot feed a suitable amount of resin in the entirety of mold owing to a wearing caused by the glass fiber contents in the resin. The product free from such molding defect was evaluated as accepted one. For the evaluation of moldability, the case of at least 90% acceptance was represented in "○(good)" while the case of less than 90% was represented in "×(bad)".

The static rupture strength was measured by conducting dynamic strength test, wherein the engine mount 1 was fixed on a testing stand 7 through bolts 71, with the inner cylinder 2 engaged to a hook member 8 and the inner cylinder 2 was displaced in the upper direction at a crosshead speed of 10 mm/min. The tensile strength when the bracket 5 was partly ruptured was indicated in terms of index, assuming that of a case with a glass fiber content of 30% by weight is 100. The static rupture strength was also evaluated by the level of rupture strength and represented as "◎ (excellent)" in case of 17 KN or more, "○ (good)" in case of 13~17 KN, and "× (bad)" in case of less than 13 KN.

TABLE 1

| Material | Amount (wt. part) |
| --- | --- |
| Natural Rubber | 100 |
| Aromatic Process Oil | 6 |
| Carbon Black FEF | 30 |
| Zinc Oxide | 5 |
| Stearic Acid | 1 |
| Sulfur | 1.5 |
| Vulcanization Accelerator CZ | 2.0 |

TABLE 2

| Content of Glass fiber (wt %) | Moldability | | Static Rupture Strength | |
| --- | --- | --- | --- | --- |
| | Percentage of Acceptance | Evaluation | Index | Evaluation |
| 20 | 100% | ○ | 70 | x |
| 30 | 100% | ○ | 100 | ○ |
| 45 | 100% | ○ | 125 | ◎ |
| 60 | 100% | ○ | 135 | ◎ |
| 70 | 70% | x | 145 | ◎ |

As shown in Table 2, in case where the content of glass fiber is 30~60% by weight, both mechanical strength and moldability were satisfied.

EXAMPLE 2

Figure 3:
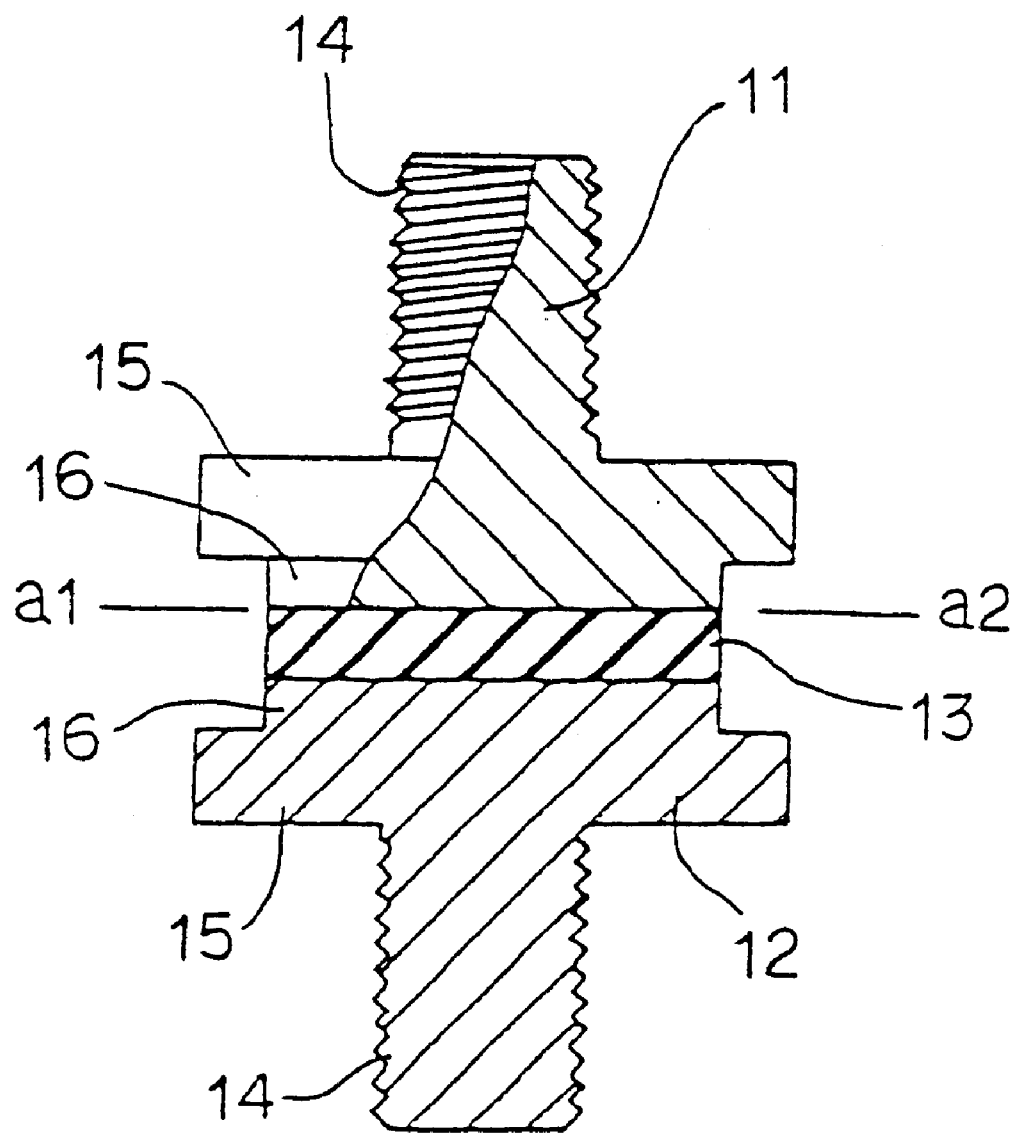
FIG. 3 is a sectional view of a sample for adhesiveness testing used in Examples 2 to 4.

FIG. 3 illustrates the shape of a sample of rubber-resin composite used for the adhesion test of Example 2. This sample is composed of a resin molding 11, a metal member 12 and a vulcanized rubber molding 13. At the interface a1–a2 between the vulcanized rubber molding 13 and the resin molding 11 there is formed an adhesive layer containing primarily chlorosulfonated polyethylene. The resin molding 11 is made up of a screw 14, a flange portion 15 and an adhesive portion 16 having a predetermined area. This is also true with the metal member 12.

The sample of adhesion test is prepared in the following procedure:

(i) On the surface of the metal member 12 to be adhesive bonded to the rubber, a known vulcanization adhesive agent suitable for the adhesion of the metal and rubber is coated, and a rubber composition is further introduced to vulcanize it under heat and pressure conditions by press vulcanization, injection molding, or the like, whereby a composite of the vulcanized rubber molding 13 and the metal member 12 united together is formed.

(ii) On the adhesion surface a1–a2 of the vulcanized rubber molding 13 of the preceding composite, an adhesive layer is formed, and the rubber product is arranged in a predetermined mold. Then the thermoplastic resin containing inorganic short fiber is injection molded into the resin molding 11, and the sample for adhesion test is ultimately obtained.

Six samples of No. 1 to No. 6 for such testing were prepared as described below:

Sample No. 1:

An unvulcanized rubber composition according to the formula shown in Table 1 above was prepared by a customary procedure and injection molded into a composite of the vulcanized rubber molding 13 and the metal member 12 united together. This composite piece was arranged in a mold, simultaneously with which a thermoplastic resin in molten state was injection molded, thus yielding the intended sample. The thermoplastic resin used here is polyamide 66 to which 50% by weight of glass fiber chopped strand is added and kneaded. Its molding conditions were mold temperature of 140° C., resin temperature of 300° C., injection pressure of 80 MPa. In injection molding, adhesive primarily containing chlorosulfonated polyethylene (trade name of Chemlok 252X, manufactured by Lord Co.) was coated on the adhesion surface a1–a2 of the vulcanized rubber molding 13 to the thermoplastic resin in a dry film thickness of 20 μm, and dried. Thereafter bis-3-triethyoxysilylpropyltetrasulfide (trade name of Si-69 manufactured by Degussa Co.) was applied by brush coating. Preliminary heating of the rubber molding before injection molding was not conducted.

Sample No. 2:

This sample was prepared in a similar procedure to that of Sample No. 1 except that gamma-glycydoxypropyltrimethoxysilane (trade name of A-187 manufactured by Nippon Unicar Co.) was used as a silane coupling agent and coated on the vulcanized rubber molding 13.

Sample No. 3:

Using the same coupling agent and the same adhesive as in Sample No. 1, the composite piece provided with the vulcanized rubber molding 13 was preheated at 120° C. for 30 minutes before arranging in the mold. Except for the preheating, this sample was prepared under the same conditions as in Sample No. 1.

Sample No. 4:

In the procedure of preparing Sample No. 1, after injection molding of the resin molding 11, post curing at 120° C. for 60 minutes was conducted to yield this sample.

Sample No. 5:

In the procedure of preparation of Sample No. 3, after injection molding of the resin molding 11 post curing was conducted at 120° C. for 60 minutes to give this sample.

Sample No. 6:

In the procedure of preparing Sample No. 1, instead of coating the coupling agent on the adhesive layer, the coupling agent was added to the adhesive and the resulting adhesive solution additionally containing the coupling agent was coated in a dry film thickness of ca. 20 μm on the vulcanized rubber molding 13 with brush coating. Except for that, this sample was prepared in a similar manner to Sample No. 1. Here the coupling agent was added in 25% by weight based on the solid content of adhesive.

Sample No. 1 to Sample No. 6 were subjected to testing for adhesion evaluation. The results obtained are shown in Table 3 below.

The test for adhesion evaluation was carried out using a tester of "Autograph DCS500" (manufactured by Shimadzu Mfg. Co.). Each of the adhesion samples was attached to the tester by fitting the respective screws 14 of the resin molding 11 and the iron member 12 to a jig having female screw conforming to the screw thread 4. On that tester tensile testing was conducted at a pulling speed of 20 mm/min, a temperature of 23° C., relative humidity of 65%. The adhesive strength was obtained by the formula:

$$T(MPa) = (F/A) \times 10^{-6}$$

(wherein F designates a maximum load (N), and A an adhesion area (m²).)

As to the rupture mode, for example, the case where the rubber on the rupture surface occupies 100% is indicated as "R100" (which means a rupture of the vulcanized rubber material and accordingly, good adhesiveness) and the case of 80% was indicated as "R80". As a practical standpoint, R60 or upward is enough and usable. Interfacial separation between the vulcanized rubber molding and the resin molding was represented by RP.

For the evaluation of the adhesiveness, the case of R100 was evaluated as "⊚ (excellent)", the case of R99~R90, as "○ (good)", the case of R89~R70, as "Δ (fair)", and the case of R69 and downward, as "× (bad)".

TABLE 3

| No. | Preheating of Rubber Molding | Post Curing | Adhesive Strength (MPa) | Rupture Mode | Evaluation |
|---|---|---|---|---|---|
| 1 | — | — | 10.5 | R100 | ⊚ |
| 2 | — | — | 10.2 | R97 | ○ |
| 3 | 120° C., 30 min | — | 5.5 | R70 | Δ |
| 4 | — | 120° C., 60 min | 11.6 | R100 | ⊚ |
| 5 | 120° C., 30 min | 120° C., 60 min | 6.8 | R75 | Δ |
| 6 | — | — | 10.9 | R100 | ⊚ |

EXAMPLE 3

Using the rubber composition in Table 1, samples of the rubber-resin composite as illustrated in FIG. 3 were prepared, with the exception that the elements 11 and 12 were of a resin molding.

In this example, first, the vulcanized rubber molding 13 was prepared and coated on its both surfaces with an adhesive in a film thickness of ca. 15 μm. This rubber molding 13 under heating was arranged in the mold and polyamide 66 compounded with 50% by weight of glass fiber was injection molded to form a rubber-resin composite product, as a sample, wherein the vulcanized rubber molding 13 is bonded and united to the resin moldings 11, 12 on both sides thereof.

An adhesive containing chlorosulfonated polyethylene as a principal ingredient (trade name of Chemlok 252 X manufactured by Lord Co.) was used in Sample No. 7 while each composition obtained by adding the coupling agent as shown in Table 4 to this adhesive was used in Sample No. 8 to Sample No. 15. The amount of the coupling agent added was 25% by weight based on the solid content of the adhesive.

For comparison purposes, as the adhesive to be coated on the vulcanized rubber molding, an adhesive containing as a primary component a mixture of resorcinol type phenol resin and aldehyde-modified polyvinyl alcohol was used in Sample No. 16.

Ten kinds of the samples thus obtained were subjected to testing for evaluation of adhesiveness on Autograph DSC 500 (Shimadzu Mfg. Co.) in the same manner as in Example 2. In Table 4, adhesive strength of each Sample is indicated in terms of index on the basis of that of Sample No. 7 which index is 100.

TABLE 4

| No. | Silane Coupling Agent | Adhesiveness Index |
|---|---|---|
| 7 | None (chlorosulfonated polyethylene adhesive) | 100 |
| 8 | bis-3-triethoxysilylpropyltetrasulfide Si-69(*1) | 125 |
| 9 | bis-3-triethoxysilylpropyldisulfide Si-75(*1) | 125 |
| 10 | thiocyanatopropyltriethoxysilane Si-254(*1) | 125 |
| 11 | vinyltrimethoxysilane A-171(*2) | 125 |
| 12 | γ-methacryloxypropyltrimethoxysilane A-174(*2) | 125 |
| 13 | β-(3,4-epoxycyclohexyl)ethyltrimethoxysilane A-186(*2) | 125 |
| 14 | γ-glycydoxypropyltrimethoxysilane A-187(*2) | 125 |
| 15 | γ-mercaptopropyltrimethoxysilane A-189(*2) | 125 |
| 16 | None (resol type phenol resin adhesive) | 80 |

Notes:
*1: by Degussa Co.
*2: by Nippon Uniker Co.

EXAMPLE 4

In the preceding Example 3, each of the titan coupling agents as shown in Table 5 was added to the adhesive instead of the silane coupling and Sample No. 17 to Sample No. 29 were prepared.

Thirteen kinds of samples obtained were tested for evaluation of adhesiveness using Autograph DCS500 (Shimadzu Mfg. Co.) in the same manner as in Example 3. Results of adhesive strength obtained are represented in terms of index, when the adhesive strength of Sample No. 7 is 100, in Table 5.

TABLE 5

| No. | Titan Coupling Agent | Adhesiveness Index |
|---|---|---|
| 7 | None (chlorosulfonated polyethylene adhesive) | 100 |
| 17 | Ttramethyl orthotitanate | 125 |
| 18 | Ttraethyl orthotitanate | 125 |
| 19 | Tetrapropyl orthotitanate | 125 |
| 20 | Tetraisopropyl orthotitanate | 125 |
| 21 | Tetrabutyl orthotitanate | 125 |
| 22 | Butyl polytitanate | 125 |
| 23 | Cresyl titanate polymer | 125 |
| 24 | Stearyl titanate | 125 |
| 25 | Tetraisobutyl orthotitanate | 125 |
| 26 | 2-Ethylhexyl titanate | 125 |
| 27 | Di-isopropoxy-bis(2,4-pentadionate)titan | 125 |
| 28 | Di-isopropyl-ditriethanol aminotitanate | 125 |
| 29 | Isopropythexylene glycol titanate | 125 |
| 16 | None (resol type phenol resin adhesive) | 80 |

EXAMPLE 5

A sample was prepared using N,N'-bis(2-methyl-2-nitropropyl)-1,6-diaminohexane (trade name of Sumifine-1162 manufactured by Sumitomo Chemical Co.) instead of the silane coupling agent in the preceding Example 3. Test for evaluation of adhesiveness with this sample was conducted similarly to Example 3 using Autograph DCS500 (Shimadzu Co.). The index of adhesive strength obtained was 110 when that of Sample No. 7 was 100.

As described above, according to this invention it is possible to manufacture a rubber-resin composite at a low cost, in which the vulcanized rubber and the thermoplastic resin are bonded together by high adhesive strength without involving deterioration in physical properties and deformation of the resin. Furthermore it is possible to improve the mechanical strength of the thermoplastic resin without impairing its moldability. Therefore, this invention is particularly useful and suitable for the manufacture of vibration-proof rubber components undergoing high load, such as automobile engine mount.

What is claimed is:

1. A method of producing a rubber-resin composite comprising:
   providing a vulcanized rubber molding;
   forming an adhesive layer comprising chlorosulfonated polyethylene on a surface of the vulcanized rubber molding for bonding the vulcanized rubber molding to a thermoplastic resin;
   placing the vulcanized rubber molding in a mold; and
   pouring a thermoplastic resin in a molten state comprising 30–60% by weight of inorganic short fiber into the mold, thereby producing a rubber-resin composite wherein the thermoplastic resin is instantly bonded to the vulcanized rubber molding via the adhesive layer,
   wherein the step of forming the adhesive layer comprises using an adhesive containing said chlorosulfonated polyethylene, to which a coupling agent is added, and said coupling agent is at least one selected from the group consisting of bis-3-triethoxysilylpropyltetrasulfide, bis-3-triethoxysilyipropyldisulfide, thiocyanatopropyltriethoxysilane, vinyltrimethoxysilane, γ-methacryloxypropyltrimethoxysilane, β-(3,4-epoxycyclohexyl) ethyltrimethoxysilane, γ-glycydoxypropyltrimethoxysilane, and γ-mercaptopropyltrimethoxysilane.

2. A method of producing a rubber-resin composite comprising:
   providing a vulcanized rubber molding;
   forming an adhesive layer comprising chlorosulfonated polyethylene on a surface of the vulcanized rubber molding for bonding the vulcanized rubber molding to a thermoplastic resin;
   placing the vulcanized rubber molding in a mold; and
   pouring a thermoplastic resin in a molten state comprising 30–60% by weight of inorganic short fiber into the mold, thereby producing a rubber-resin composite wherein the thermoplastic resin is instantly bonded to the vulcanized rubber molding via the adhesive layer,
   wherein the step of forming the adhesive layer comprises using an adhesive containing said chlorosulfonated polyethylene, to which a coupling agent is added, and said coupling agent is a titan coupling agent.

3. The method of producing a rubber-resin composite as set forth in claim 2, wherein the titan coupling agent is at least one selected from the group consisting of tetramethyl orthotitanate, tetraethyl orthotitanate, tetrapropyl orthotitanate, tetraisopropyl orthotitanate, tetrabutyl orthotitanate, butyl polytitanate, cresyl titanate polymer, stearyl titanate, tetraisobutyl orthotitanate, 2-ethylhexyl titanate, di-isopropoxy-bis(2,4-pentadionate) titan, di-isopropyl ditriethanolamine aminotitanate, and isopropylhexylene glycol titanate.

4. A method of producing a rubber-resin composite comprising:
   providing a vulcanized rubber molding;
   forming an adhesive layer comprising chlorosulfonated polyethylene on a surface of the vulcanized rubber molding for bonding the vulcanized rubber molding to a thermoplastic resin;

placing the vulcanized rubber molding in a mold; and pouring a thermoplastic resin in a molten state comprising 30–60% by weight of inorganic short fiber into the mold, thereby producing a rubber-resin composite wherein the thermoplastic resin is instantly bonded to the vulcanized rubber molding via the adhesive layer, wherein the step of forming the adhesive layer comprises using an adhesive containing said chlorosulfonated polyethylene, to which a coupling agent is added said coupling agent is N,N'-bis(2-methyl-2-nitropropyl)-1,6-diaminohexane.

5. A rubber-resin composite comprising:

a vulcanized rubber molding;

an adhesive layer comprising chlorosulfonated polyethylene formed on a surface of the vulcanized rubber molding; and a thermoplastic resin comprising 30–60% by weight of inorganic short fiber, wherein the thermoplastic resin is bonded to the vulcanized rubber molding via the adhesive layer, wherein the adhesive layer comprises an adhesive containing chlorosulfonated polyethylene and a coupling agent added thereto, and said coupling agent is at least one selected from the group consisting of bis-3-triethoxysilylpropyltetrasulfide, bis-3-triethoxysilylpropyldisulfide, thiocyanatopropyltriethoxysilane, vinyltrimethoxysilane, γ-methacryloxypropyltrimethoxysilane, β-(3,4-epoxycyclohexyl) ethyhrimethoxysilane, γ-glycydoxypropyltrimethoxysilane, and γ-mercaptopropyltrimethoxysilane.

6. A rubber-resin composite comprising:

a vulcanized rubber molding;

an adhesive layer comprising chlorosulfonated polyethylene formed on a surface of the vulcanized rubber molding; and a thermoplastic resin comprising 30–60% by weight of inorganic short fiber, wherein the thermoplastic resin is bonded to the vulcanized rubber molding via the adhesive layer, wherein the adhesive layer comprises an adhesive containing chlorosulfonated polyethylene and a coupling agent added thereto, said coupling agent is a titan coupling agent.

7. The rubber-resin composite as set forth in claim 6, wherein the titan coupling agent is at least one selected from the group consisting of tetramethyl orthotitanate, tetraethyl orthotitanate, tetrapropyl orthotitanate, tetraisopropyl orthotitanate, tetrabutyl orthotitanate, butyl polytitanate, cresyl titanate polymer, stearyl titanate, tetraisobutyl orthotitanate, 2-ethyihexyl titanate, di-isopropoxy-bis(2,4-pentadionate) titan, di-isopropyl ditriethanolamine aminotitanate, and isopropylhexylene glycol titanate.

8. A rubber-resin composite comprising:

a vulcanized rubber molding;

an adhesive layer comprising chlorosulfonated polyethylene formed on a surface of the vulcanized rubber molding; and a thermoplastic resin comprising 30–60% by weight of inorganic short fiber, wherein the thermoplastic resin is bonded to the vulcanized rubber molding via the adhesive layer, wherein the adhesive layer comprises an adhesive containing chlorosulfonated polyethylene and a coupling agent added thereto, and said coupling agent is N,N'-bis(2-methyl-2-nitropropyl)-1,6-diaminohexane.

9. A method of producing a rubber-resin composite comprising:

providing a vulcanized rubber molding;

forming an adhesive layer comprising chlorosulfonated polyethylene on a surface of the vulcanized rubber molding for bonding the vulcanized rubber molding to a thermoplastic resin;

coating a coating solution containing a coupling agent on a surface of the adhesive layer;

placing the vulcanized rubber molding in a mold; and pouring a thermoplastic resin in a molten state comprising 30–60% by weight of Inorganic short fiber into the mold, thereby producing a rubber-resin composite wherein the thermoplastic resin is instantly bonded to the vulcanized rubber molding via the adhesive layer, wherein said coupling agent is at least one selected from the group consisting of bis-3-triethoxysilylpropyltetrasulfide, bis-3-triethoxysilylpropyldisulfide, thiocyanatopropyltriethoxysilane, vinyltrimethoxysilane, γ-methacryloxypropyltrimethoxysilane, β-(3,4-epoxycyclohexyl) ethyltrimethoxysilane, γ-glycydoxypropyltrimethoxysilane, and γ-mercaptopropyltrimethoxysilane.

10. A method of producing a rubber-resin composite comprising:

providing a vulcanized rubber molding;

forming an adhesive layer comprising chlorosulfonated polyethylene on a surface of the vulcanized rubber molding for bonding the vulcanized rubber molding to a thermoplastic resin;

coating a coating solution containing a coupling agent on a surface of the adhesive layer;

placing the vulcanized rubber molding in a mold; and pouring a thermoplastic resin in a molten state comprising 30–60% by weight of inorganic short fiber into the mold, thereby producing a rubber-resin composite wherein the thermoplastic resin is instantly bonded to the vulcanized rubber molding via the adhesive layer, wherein said coupling agent is a titan coupling agent.

11. A method of producing a rubber-resin composite comprising:

providing a vulcanized rubber molding;

forming an adhesive layer comprising chlorosulfonated polyethylene on a surface of the vulcanized rubber molding for bonding the vulcanized rubber molding to a thermoplastic resin;

coating a coating solution containing a coupling agent on a surface of the adhesive layer;

placing the vulcanized rubber molding in a mold; and pouring a thermoplastic resin in a molten state comprising 30–60% by weight of inorganic short fiber into the mold, thereby producing a rubber-resin composite wherein the thermoplastic resin is instantly bonded to the vulcanized rubber molding via the adhesive layer, wherein said coupling agent is N,N'-bis(2-methyl-2-nitropropyl)-1,6-diaminohexane.

* * * * *